Figure 1:
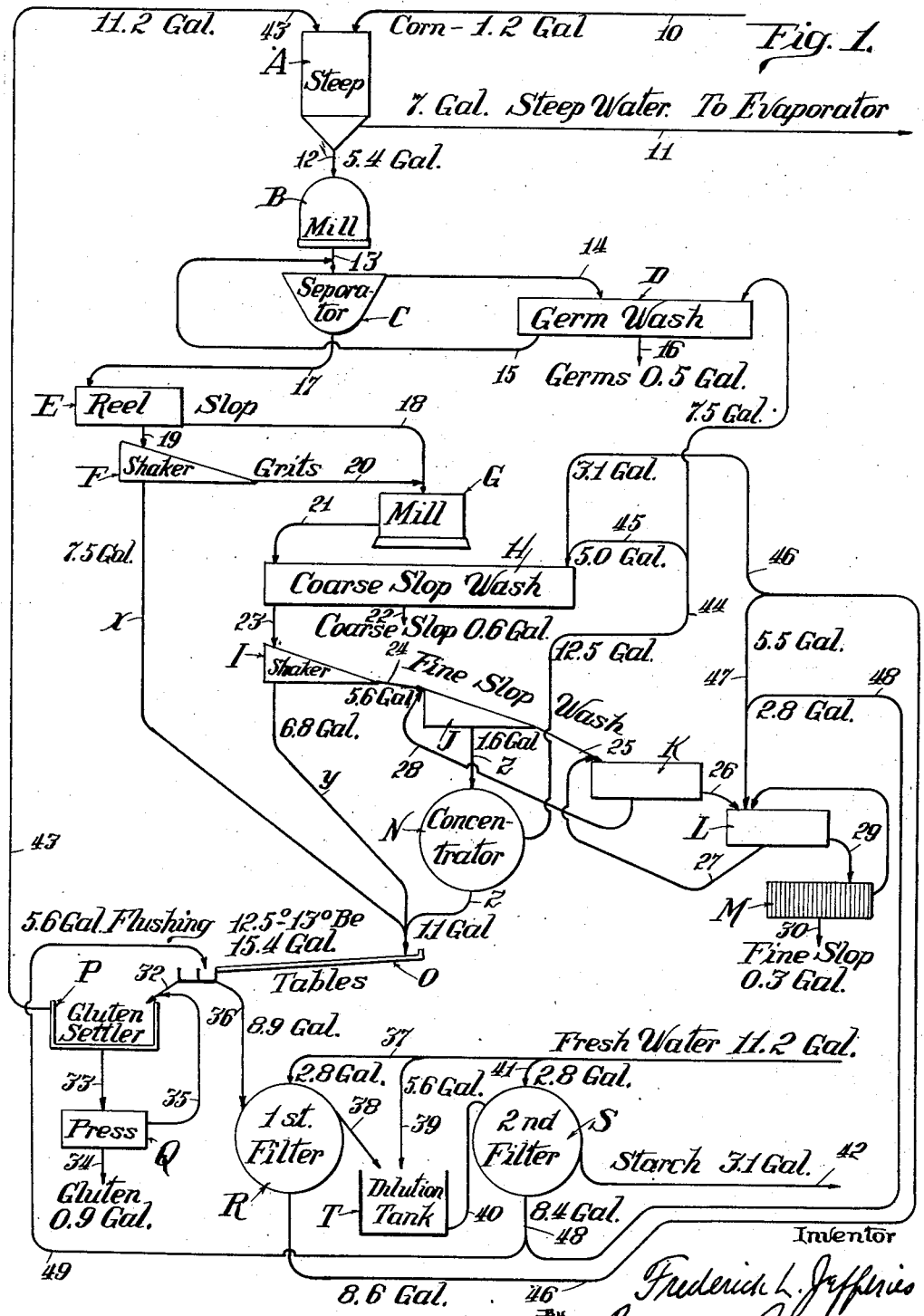

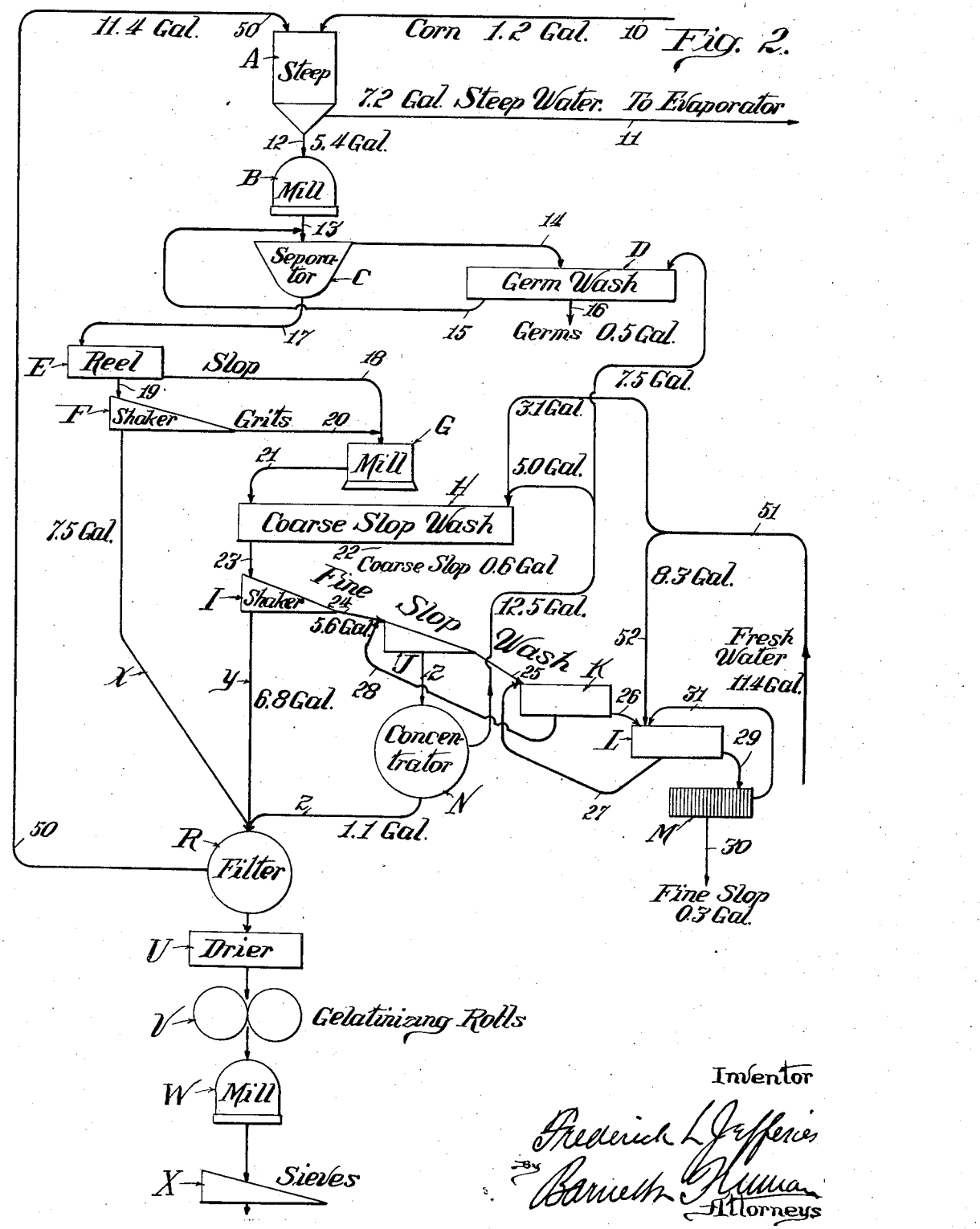

Patented Aug. 3, 1937

2,088,706

UNITED STATES PATENT OFFICE 2,088,706

MANUFACTURE OF STARCH

Frederick L. Jefferies, La Grange, Ill., assignor to International Patents Development Company, Wilmington, Del., a corporation of Delaware Application April 26, 1933, Serial No. 668,095

25 Claims. (Cl. 127—68)

This invention relates to the manufacture of starch from corn by the "wet" method in which, according to common practice, the corn after being steeped in water containing sulphur dioxide, is subjected to separating operations in water for removal of the germ, bran, or hull and fibre, the process at this stage (the wet starch system) being divided, commonly, into three operations called germ, coarse slop and fine slop separations, after which the resultant mixtures of starch, gluten and water (starch milk sometimes called mill starch) are combined and run through shallow slightly inclined troughs (starch tables) for separation of the gluten and bulk of the water from the starch; the starch remaining on the tables and the gluten and water tailing off therefrom. This tabling operation is followed, ordinarily, by settling the gluten out of the table effluent in vats (gluten settlers). The starch is removed from the tables, for example, by flushing with water, and may be subjected to one or more washing operations usually in vacuum or pressure filters of the displacement type. The mill starch stream, made up of the three streams from the separating operations, has had, ordinarily, a density at the table heads between 5° and 7° Baumé.

It has been customary to use a minor portion of the water from the gluten settlers (gluten water), which liquid contains relatively large quantities of corn solubles, micro-organisms and other impurities, for steeping the corn; and to draw off the steep water and evaporate it for the purpose of saving the soluble substances of the corn therein which have considerable value. The amount of gluten water which can thus be used for steeping is limited, for economic reasons, by the cost of evaporation of the steep water, which, if too dilute, will not pay to evaporate. The customary steep water draw-off is about 7 gallons per bushel of corn ground—all water computations referred to herein being upon the basis of bushels of corn ground and treated in the process. A larger steep water draw-off would entail a proportionately higher expense for evaporation; and somewhere a point of maximum practical draw-off is reached, probably about ten gallons, as disclosed in my application 606,897, filed April 22, 1932, of which the present application is a continuation in part. Beyond this the cost of evaporation exceeds the value of the evaporated product.

It has also been customary to re-use the rest of the gluten water—the major portion of it—in the wet starch system, that is, in the germ, coarse slop and fine slop separations, in the place of fresh water; and to use in the same operations, as make-up water, wash water or filtrate from the starch washing filters and a starch making system so operated has been called in factory parlance a "bottled-up system". Such a system is disclosed in U. S. Patent to Rush O. McCoy, No. 1,651,611, patented December 6, 1927.

A "bottled-up" system effects complete saving of the corn substance—soluble and insoluble—in the process waters, economizes water and prevents stream pollution, as no process water need be sent into rivers or lakes via the factory sewer; but the re-use of the gluten water in the wet starch system, forming a part of this process, is objectionable because it takes back into the system the relatively large quantities of soluble substances in the gluten water together with the micro-organisms and products of micro-organic activity developed in such water in its passage through the various stages of the process and during the period of standing in the gluten settlers, and these non-starch bodies and substances constitute and give rise to impurities in the starch, some of which impurities appear to be of a colloidal character, difficult to remove by washing. The excess of solubles necessarily increases the difficulties of washing and makes repeated filterings of the starch essential for even a fairly high degree of purity.

In a cyclic system involving repeated return of process waters with draw-off from the system at one or more points, it does not follow that any given volume of process water returned to the system, during a given period of time, will be all drawn off during its passage through the system. On the contrary, an indeterminate portion of any given volume of returned process water may be recirculated, with its solubles, micro-organisms and their products, for an indefinite number of times and thus a certain number of micro-organisms may remain and thrive in the system for a long period of time; and this condition necessarily brings about an increased quantity in the starch of such impurities as are the result of micro-organic activity. That is, as in any cyclic system, an indeterminate part of the process water may remain in the system for a long time and thereby increase the infection of the system.

One of the primary objects of this invention is to make certain improvements, specifically in a cyclic process such as has been last described, in which some or all of the process waters are re-used, which improvements, may however, be employed also to advantage in systems where the process waters are sent to the sewer; and, more specifically, to make certain improvements in starch making processes involving tabling the mill starch derived from the germ, coarse slop and fine slop separation to recover, separately, the starch and the gluten, which improvements are nevertheless usable, also, in systems employing other methods for effecting these separations.

These improvements, in certain novel combinations to be described, comprise: the removal of water from the mill starch to increase its density, preferably by concentration or extraction of water, substantially free from insoluble solids from the mill starch stream from the fine slop separation (because of the lower content of solids, soluble and insoluble in the latter) and the re-use of the extracted water in place of fresh water in the wet starch system; the tabling of the mill starch (or equivalent treatment for recovery of the starch and gluten) at much higher densities than has been heretofore practiced or thought to be possible; and the return to the steeping system of all or substantially all of the high soluble or gluten water so that this process water which contains a relatively large quantity of soluble substances, and is also likely to be highly infected with micro-organisms through standing in the gluten settlers is not re-circulated through the system at all, but after being used for steeping corn, goes directly out of the system via the evaporators; the germ, coarse slop and fine slop systems being supplied, in case the starch, as is customary, is washed with fresh water, with wash water from the starch filters, which is relatively pure, in comparison with the gluten water, and which, in this case, supplements the process water extracted from the mill starch stream before the tabling operation, and which, though less pure than the starch wash water, contains a much lower impurity content than the gluten water.

The invention is illustrated in two typical embodiments in the accompanying drawings which are flow-sheet diagrams; Fig. 1 illustrating a starch making system in which the gluten is separated from the starch and the starch washed with fresh water; and Fig. 2 illustrating a system in which the mill starch is used, as such, without the separation therefrom of the gluten.

The invention is not to be regarded as limited to these particular embodiments.

The principles of the invention may be applied to systems of quite different character. Nor is the invention limited to the particular apparatuses indicated diagrammatically in the drawings, the use of any particular apparatuses for the different process steps being in many cases, optional. The drawings illustrate a water balance based on specific table head densities (12.5°-13° Baumé) a specific draw-off of steep water from the steeps, to wit, 7 gallons per bushel of corn ground, and, in the Fig. 1 embodiment of the invention, the use of a particular type of starch washing apparatus. The water balance of the Fig. 1 process, and its modification in Fig. 2, are merely illustrative and would necessarily have to be changed with variations in draw-off, table densities and other operating conditions.

The numerals on the drawings followed by the abbreviation "Gal." indicate water or water content in terms of bushels of corn ground and operated on,—the customary way of computing water quantities in wet starch house practice. By "impurities" is intended all non-starch substances in the material, except the germ, gluten and slops (hull, bran and fibre), and include corn solubles and other solubles, micro-organisms, enzymes and their products, and any residual insolubles and colloidal matter in the process waters and in the starch. By "mill starch" is intended the mixture or mixtures of starch, gluten and water derived from the germ, coarse slop and fine slop separations. By "gluten water" is intended the primary process water containing the largest quantity of impurities, whether this water be removed from the system after settling out of the gluten in gluten settlers or otherwise at that or at an earlier stage of the procedure, for example, as in the Fig. 2 arrangement. Where reels or shakers are shown and referred to as such, either type of sieving apparatus may be substituted for the other, or other equivalent separating devices may be used. The term "concentrator" is intended to cover any de-watering device, such as a filter or settling tank. By "wet starch system" is intended the germ, coarse slop and fine slop separations.

Instead of flushing, the starch may be removed from the starch tables by any customary mechanical means. In short all modifications of the specifically disclosed processes, within the scope of the appended claims, are intended to be covered herein. The term "fresh water" is used necessarily in a relative sense. All water contains some solubles and impurities. By fresh water is intended either water from service pipes, wells, etc. or process water containing very small quantities of solubles or other impurities in comparison with the quantities of such substances in the material treated by this water.

Referring first to Fig. 1, A represents one of the steep tanks of the steeping system, this system consisting, ordinarily, of a number of tanks in which the corn is steeped with water containing sulphur dioxide at temperatures above room temperature which vary in different starch factories. The steep water is drawn off to evaporators which are not shown. The steeped corn is coarse ground in mill B, the germs separated by flotation from the rest of the material in separators C and washed in the germ washing system D, which consists of a series of reels and/or shakers. The degerminated corn is put through a reel E to remove the slop, the liquid magma passing over E is put through a shaker F to remove the grits, i. e. starch particles; and slop and grits are ground in mill G. The ground material is washed in the coarse slop wash H consisting of a system of reels and/or shakers operated on the counter-current principle. The liquid from the coarse slop wash containing starch, gluten and fine bran particles, is passed over a sieve I for intercepting the fine bran particles, which latter are washed in the fine slop washing system to remove starch and gluten; this system consisting, as shown in the drawings of a shaker J and reels K and L arranged on the counter-current principle. M is a press for pressing the water out of the fine slop. Similar presses, not shown on the drawings are used for pressing the water out of the germ and coarse slop. The fine slop press appears on the drawings because the other elements of the fine slop washing system are shown separately.

For the purpose of reducing the amount of water in the material going to the tables or other starch separating apparatus, the mill starch from the fine slop wash is preferably concentrated in concentrator N by extraction of water which is re-used in the separating operations above described. The concentrated mill starch is mixed with the unconcentrated mill starch streams from the germ system from the coarse slop wash and this mixture is subjected to a tabling or other operation for recovery of the starch, the starch tabling being indicated at O. The gluten and water from the starch tables are run into the gluten settler P for the settling out of the gluten which is pressed to extract water in press Q. The starch is flushed from the starch tables O and subjected to washing operations in the starch filters R and S, with an intervening fresh water dilution in the dilution tank T.

The connections between these apparatuses (which will be referred to as pipes, although any suitable conduits or conveyors may be employed) will be designated in connection with the description of operation of the process which follows:

*Operation of process Fig. 1.*—The corn containing 1.2 gallons of water enters the steeping system at 10, and the steep water, seven gallons in amount, is withdrawn from the steeping system at 11. The steeped corn, containing 5.4 gallons of water, passes through pipe 12 to the mill B, and the coarsely ground material from the mill through pipe 13 to the separator C. The germs floated in the separator C are discharged to the germ wash D through pipe 14, the starch milk being returned to the separator C through pipe 15. The washed germs, containing 0.5 gallons of water, are discharged from the system at 16.

The degerminated corn passes through pipe 17 to reel E, and from reel E the slop goes through pipe 18 to mill G. The liquid substance from reel E passes through pipe 19 to shaker F from which the grits tail off and pass through pipe 20 to mill G. The finely ground material passes from mill G through pipe 21 to the coarse slop wash H. The coarse slop from this operation, containing 0.6 gallons of water, is discharged from the system at 22. The liquid from the coarse slop wash H passes by pipe 23 to a shaker I. The fine slop tailing off from shaker I and containing 5.6 gallons of water passes through pipe 24 to the fine slop wash, going first over the shaker J, then by pipe 25 to the reel K and by pipe 26 to the reel L. The liquid from reel L passes through pipe 27 back to reel K, and the liquid from reel K passes by pipe 28 back to shaker J. The fine slop from reel L passes through pipe 29 to the press M, from which it is discharged from the system at 30 containing 0.3 gallons of water. The water pressed out of the fine slop in press M goes by pipe 31 back to the head end of reel L.

The mill starch from the germ system via reel E and shaker F contains the largest quantity of solubles and other impurities. This stream is indicated at $x$. The mill starch stream $y$ issuing from the coarse slop wash via the shaker I contains a smaller amount of solubles and other impurities. The mill starch stream indicated at $z$—$z$, derived from the fine slop wash, contains the smallest quantity of solubles and other impurities.

The invention contemplates the extraction of water from the mill starch before the mill starch is tabled and the use of the extracted water back in the wet starch system. This extraction of water could take place after the three streams $x$, $y$, $z$ had been combined; but, in order to carry out the principle of sending as large a proportion as possible of the impurities in the process water to the steeps and returning as small a proportion as possible to the wet starch system, the preferable arrangement is that shown which consists in extracting the water from the low soluble $z$ stream derived from the fine slop wash and mixing this concentrated mill starch with the unconcentrated mill starch streams from the germ system and coarse slop wash. Furthermore, the fine slop mill starch is much more dilute in respect to suspended solids, that is starch and gluten, so that the extraction of water can be effected more conveniently and economically than one of the other mill house streams or from all combined.

In the process as shown in the drawings 13.6 gallons of mill starch enters the concentrator from the shaker J. The concentrator delivers mill starch containing 1.1 gallons of water and this is mixed with 7.5 gallons in the conduit $x$ and 6.8 gallons in the conduit $y$, making all told 15.4 gallons of mill starch put over the tables O. The density is approximately 12.5° to 13° Baumé.

The gluten and water passes from starch tables O through pipe 32 to the gluten settler P. The settled gluten passes through pipe 33 to the press Q from which the gluten, containing 0.9 gallons of water, is discharged from the system at 34, the water from the press going back to the gluten settler through pipe 35.

The starch is removed from the tables either by mechanical means or, preferably, as shown, by flushing. The flushed starch, containing 8.9 gallons of water, passes through pipe 36 to the first filter R. In this filter the starch is first de-watered and is then washed with fresh water, 2.8 gallons of which enters the first filter from the fresh water supply pipe 37. The washed starch is discharged through pipe 38 to the dilution tank T where it is diluted with 5.6 gallons of fresh water through the branch water supply pipe 39. The diluted starch passes from tank T through pipe 40 to the second filter S where it is de-watered and washed with 2.8 gallons of fresh water introduced through branch water pipe 41; the fresh water supply in this particular water balance being in all 11.2 gallons. The washed starch is discharged from the filter S at 42 and contains 3.1 gallons of water.

The gluten water from settler P passes through pipe 43 to the steeping system. The amount is 11.2 gallons, some of which is absorbed in the corn and the balance, 7.0 gallons, is withdrawn from the system as steep water for evaporation.

The concentrator N extracts 12.5 gallons of water from the $z$ mill starch stream and this liquid passes into pipe 44, 7.5 gallons going to the germ wash D and 5.0 gallons through branch pipe 45 to the coarse slop wash H.

The distributing principle, followed here, as elsewhere through the system, is to reintroduce into the system at the steeps the liquid highest in solubles, the liquid next high in solubles at a point or points in the next degree remote from the end of the system at which the starch is discharged, and so on throughout the process. The wash water from the first filter R, which is higher in solubles than the wash water from the second filter S, (8.6 gallons in volume) enters pipe 46, 3.1 gallons going to the coarse slop wash H and 5.5 gallons through branch pipe 47 to the fine slop wash at reel L. The wash water from the second filter S, containing the minimum amount of solubles, enters pipe 48, 2.8 gallons going to pipe 47 and thence to the fine slop wash at reel L, and the balance, 5.6 gallons being used for flushing the starch from the tables O (by a system which is in common use and the details of which need not be shown).

The system illustrated in Fig. 1 is a completely cyclic system. The process waters are returned completely to the system for re-use. No process water goes to the sewer. The only water discharged from the system is that drawn off from the steeps and discharged from the system with the solids, which latter contain a certain amount of absorbed moisture.

In a completely cyclic system, such as this, having a limited steep water draw-off, it has been necessary, under former practices, to return a large portion of the gluten water to the wet starch system with the objectionable results that have been mentioned. By extracting water from the mill starch and using the extracted water back in the wet starch system, it is possible to return all of the gluten water, (the amount of which is diminished by the high density of the mill starch), to the steeps without discharge of any to the sewer; and to accomplish this desirable result without increasing the normal steep water draw-off of about 7 gallons.

However, this involves tabling the mill starch at a density practically double or more than double the customary tabling densities. It has been, in fact, the general belief or assumption throughout the industry for many years that to bring about a proper separation of the gluten from the starch on the starch tables the density of the mill starch should not be in excess of about 7° Baumé. In some factories tabling densities are as low as 5 or 5½° Baumé. This invention is based in part upon the discovery that by passing smaller volumes of the mill starch over the tables during the same unit of time, practically as good and perhaps even a better separation can be obtained with a 13° Baumé liquor, or even a liquor at 15° Baumé as has heretofore been obtained by using a 5° to 7° Baumé liquor. Starch tables in different factories may differ somewhat in length and pitch. Ordinarily the tables are about 110 feet long, 2 feet wide, and have a pitch of 5 inches from end to end. Under these conditions—namely, table head densities of 5°–7° Baumé—the mill starch is ordinarily delivered to the tables at approximately three gallons per minute per table. In accordance with the present invention with tables as described (but having a pitch of 10 inches instead of 5 for reasons to be stated) mill starch of a density, for example, of 13° Baumé is supplied to the table heads at the rate of about 1.8 gallons per minute, per table. If the tabling density be in the neighborhood of 11° Baumé, the rate of flow may be somewhat more rapid, say 2.0 gallons per minute. For a 15° Baumé liquor the rate may be 1.2 gallons. For a density of 8° Baumé the supply should be about 2.5 gallons per minute. It will be obvious that these figures are only approximate. That is, the rate of flow should be approximately in inverse ratio to the density, assuming that the tables are the same. In order to get the best results, however, the pitch of the tables should be increased over that which has been customary; that is the pitch of the tables should vary directly as the density of the mill starch. Instead of a 5 inch pitch, the tables should have a pitch up to say 12 inches for densities from 8° Baumé up to 15° Baumé. Preferably for 13° Baumé the pitch is placed at 10 inches. While table adjustments are given for densities as low as 8° Baumé, it is hardly practical so far as the starch making process of the present application is concerned to table at less than 10° Baumé since below that density the steep water draw-off would be excessively high.

The problem in tabling mill starch is to keep all, or substantially all, of the gluten in suspension until the liquid vehicle has passed from the starch table, while controlling conditions so that the starch tailing off with the gluten—there is always some starch in the separated gluten—is kept to a minimum. If the same volume of mill starch per minute were delivered to the head of the table, but with the mill starch at a density of 13° Baumé instead of 7°, the amount of starch tailing off with the gluten would be considerably increased. By reducing the volume of mill starch per minute, the amount of starch in the gluten can be kept at normal, or can even be reduced; but if the inclination of the table remains the same, some of the gluten is likely to deposit on the tables with the starch. This is due to the circumstance that, as a factor of safety, the tables are made quite a little longer than the wedges of starch intended to be deposited on them (which of course increase in length as the tabling proceeds), so that the water with the gluten in suspension, must flow over a considerable length of table of the actual table pitch not increased by the starch wedge. If the amount of water in the mill starch is diminished, as contemplated by this invention, there will be a smaller quantity of gluten water, at higher concentration, flowing over the ends of the tables beyond the starch wedges; and this results in the deposition of some of the gluten. This may not be important where a highly pure starch is not required. However, to give starch of the highest purity it is advisable to increase the pitch of the tables, as indicated. This will tend to carry the wedge of starch a little further down the table, but as there is a factor of safety here, and as the starch tends to deposit principally at the upper end of the table, the increased velocity of the mill starch will not be sufficient to cause any increase of starch carried over with the gluten. On the other hand this increased pitch will increase the velocity of the gluten water over the lower end of the table so as to prevent settling of the gluten.

It will be understood that the specific figures of gallons of mill starch supplied to the table heads per minute are based, for practical reasons, on a table inclination of 10 inches. Theoretically there should be a different table pitch for each density, but this is hardly practical for actual factory conditions. Moreover, the length of the table is necessarily a factor and change of table length will necessarily involve corresponding adjustment of the factors of gallonage to the table heads and pitch of the tables. The above directions will make it possible, however, for anyone skilled in the art to work out for tables of any ordinary length, the proper rate of flow and the proper pitch for any given density of mill starch between 8° and 15° Baumé. The exact figures will depend also upon whether the ultimate desideratum is the reduction to a minimum of gluten in the starch or the reduction to a minimum of starch in the gluten. The starch tabling process just described is not claimed per se in this application, being the subject matter of a co-pending application, Serial No. 757,179, filed December 12, 1934, as a division hereof. In the present case the tabling operation is claimed only in combination with the other features of the starch making system herein shown.

It will be obvious that some advantages of this invention may be had either by increasing somewhat the steeep water draw off, although this will involve increased cost of evaporation; or by discharging some of the process waters to the sewer, in which latter case it is advisable to discharge the waters having the lowest soluble content. In such modification contemplated as possible, the water balance figures would have to be correspondingly adjusted with increase of fresh water supply in case any process water were sent to the sewer.

In fact the concentration of the mill starch and the subsequent separation of the gluten from the starch with the mill starch mixture at a higher density would have some advantage even in a system in which all or a large part of the gluten and starch wash waters were sent to the sewer. The re-use of the water extracted by the concentrator back in the wet starch system would effect an economy in fresh water, making it possible to use, roughly, half the amount of fresh water required by the ordinary straight or non-cyclic system.

The invention may also be applied to a starch system in which there is no separation of starch and gluten, that is in a system in which the mill starch is used as such. The gelatinized starch product known as "mogul starch" for example, is made by treating the mill starch without removing the gluten therefrom.

Fig. 2 herein discloses the invention as applied to such a system.

The apparatus down to the point of junction of the x, y and z streams may be the same as the apparatus disclosed in Fig. 1; and in the drawings the elements are given the same reference characters. The mill starch, instead of being tabled, is put through a filter R and the filtrate returned to the steeps through pipe 50, the amount being 11.4 gallons. The dewatered starch is then dried in dryer U to the desired moisture content and passed through heated gelatinizing rolls V. The material from the rolls is ground in the mill W and put through sieves X.

The fresh water used in the process of Fig. 1 for washing the starch in the Fig. 2 process is introduced through pipe 51 into the coarse and fine slop washing system. The amount of fresh water is 11.4 gallons and 3.1 gallons goes to the coarse slop wash; 8.3 gallons being sent through branch pipe 52 to the fine slop wash. The steep water draw-off is 7.2 gallons.

Other modifications will readily suggest themselves to those skilled in the art.

This application is a continuation in part of co-pending application Serial No. 606,897 filed April 22, 1932 (Patent 2,050,330, August 11, 1936) Fig. 1 of the drawings herein corresponding with Fig. 3 of application Serial No. 606,897.

I claim:

1. In the process of manufacturing starch from corn in which the corn is steeped, the steeped corn subjected in a comminuted state and in water to a series of separating operations yielding separate mixtures of starch, gluten and water having different contents of solubles, the starch and the gluten recovered and the waters derived from the process, other than the steep water, re-used in the process: the improvement which comprises extracting water, substantially free from insoluble solids, from the starch and gluten material of low content of solubles before the starch and gluten material is treated for recovery of the starch and gluten; reusing the water so extracted in separating operations, as aforesaid, on subsequently treated corn; and utilizing for steeping water left after recovery of the starch and gluten.

2. In the process of manufacturing starch from corn in which the corn is steeped, the steeped corn subjected in a comminuted state and in water to separating operations for removing germ and slop which operations yield separate mixtures of starch, gluten and water that contain different concentrations of solubles: the improvement which consists in removing water of relatively low solubles content from the starch and gluten material and using the same in separating operations, as aforesaid, on subsequently treated corn; and removing water of higher solubles concentration from the starch and gluten material and using the same for steeping.

3. In the process of manufacturing starch from corn in which the corn is steeped, subjected to separating operations in water yielding mixtures of starch, gluten material and water containing different concentrations of solubles, the starch and gluten recovered, and substantially all of the water used in the aforesaid operations subsequent to steeping, except that absorbed by the materials treated, re-used in the process: the improvement which consists in re-using for steeping corn substantially all of the water derived from the starch and gluten mixture having the highest solubles concentration; and re-using in said separating operations water from the starch and gluten mixtures containing lesser concentrations of solubles.

4. In the process of manufacturing starch from corn comprising steeping the corn, comminuting the steeped corn, subjecting the comminuted corn to separating operations in water yielding mixtures of starch, gluten and water having different solubles contents: the improvement which consists in removing starch and gluten from the mixture of starch, gluten and water having the higher solubles content and re-using water from said mixture for steeping corn; and removing starch and gluten from the mixture of lower solubles content and re-using water from said last named mixture for said separating operations.

5. In the process of manufacturing starch from corn in which the corn is steeped, comminuted, subjected to separating operations in water, yielding starch, gluten and water mixtures containing solubles in relatively high and relatively low degrees of concentration, the starch and gluten recovered and water derived from the aforesaid operations, subsequent to steeping, re-used in the process as the process is continued: the improvement which consists in removing starch and gluten from said mixture having the higher concentration of solubles and re-using water so obtained for steeping corn; and, by a separate operation, removing starch and gluten from said mixture having the lower concentration of solubles and using water so obtained in said separating operations.

6. In the process of manufacturing starch from corn in which the corn is steeped, comminuted, subjected to separating operations in water, yielding starch, gluten and water mixtures containing solubles in relatively high and relatively low degrees of concentration, the starch and gluten recovered, the starch washed with fresh water and substantially all of the waters from the aforesaid operations, subsequent to steeping, re-used in the process as the process is continued: the improvement which consists in removing starch and gluten from said mixture having the higher concentration of solubles and re-using water so obtained for steeping corn; removing, by a separate operation, starch and gluten from said mixtures having the lower concentration of solubles and using water so obtained in said separating operations; and using starch wash water as make-up water in said separating operations.

7. In the process of manufacturing starch from corn comprising steeping the corn, comminuting the steeped corn, subjecting the comminuted corn to separating operations in water yielding mixtures of starch, gluten and water having different solubles contents: the improvement which consists in removing starch and gluten from the mixture of starch, gluten and water having the higher solubles content and re-using water from said mixture for steeping corn; and using the major portion of the water of the mixture having the lower concentration of solubles in said separating operations.

8. Process of manufacturing starch from corn comprising: steeping the corn; subjecting the steeped corn in a comminuted state and in water to operations for removing the germs, slop and gluten, yielding process waters having different contents of solubles; using substantially all of the process water having the highest solubles content for steeping corn, as the process is continued; and using substantially all of the other process waters in the operations subsequent to steeping, introducing that part of the last named process water which is higher in solubles at stages closer to the steeping operation and that part which is lower in solubles at stages more remote from the steeping operation.

9. Process of manufacturing starch from corn comprising: steeping the corn, subjecting the steeped corn in a comminuted state and in water to germ, coarse slop and fine slop separating operations, yielding separate mill starch streams; re-using substantially all of the process water of the mill starch stream from the germ separation for steeping corn, as the process is continued; and re-using substantially all of the water of the mill starch stream from the fine slop separation in one or more of the operations on the comminuted corn subsequent to steeping.

10. Process of manufacturing starch from corn comprising: first steeping the corn and withdrawing the steep water for evaporation; then subjecting the steeped corn in a comminuted state and in water to separating operations for removal of germs and slop, yielding mill starch streams having different solubles contents; separately treating said mill starch streams by operations which give process water of different solubles contents; and re-using those parts of said process water that are higher in solubles at places in the process nearer the point of discharge of the steep water, and those parts of lower solubles contents at places more remote from said point of discharge.

11. Process of manufacturing starch from corn comprising: steeping the corn; subjecting the steeped corn in a comminuted state and in water to germ, coarse slop and fine slop separations yielding separate mill starch streams of which the stream from the fine slop separation has a smaller solubles content than the other streams; re-using for steeping corn, as the process is continued, substantially all of the process water derived from the mill starch streams from the germ and coarse slop separations; and re-using in one or more of the operations subsequent to steeping substantially all of the process water of the mill starch from the fine slop separation.

12. Process of manufacturing starch from corn comprising: steeping the corn; subjecting the steeped corn in a comminuted state and in water to operations for removing germs, slop, gluten and solubles, resulting in separate process waters which have remained in the process for different lengths of time; reducing the volume of the water in the stage of the process from which is derived the process water that has been in the process for the longest time; re-using substantially all of the last named process water for steeping corn as the process is continued; and re-using the other process waters in the operations subsequent to steeping.

13. Process of manufacturing starch from corn which comprises: steeping the corn; subjecting the steeped corn in a comminuted state and in water to separating operations for removal of germs and slop; removing part of the water of the mill starch derived from these operations and re-using it in separating operations on comminuted corn subsequently treated as the process is continued; treating the residue of the mill starch for removal of starch and gluten, at a density of substantially 10° Baumé or higher; and returning substantially all of the process water resulting from said last named treatment to the steeping operation.

14. Process of manufacturing starch from corn which comprises: steeping the corn; subjecting the steeped corn in a comminuted state and in water to separating operations for the removal of germs and slop; extracting water substantially free from insolubles from the mill starch and re-using the water in separating operations as the process is continued; treating the residue of the mill starch at a density of substantially 10° Baumé or higher; and returning substantially all of the process water resulting from said last named treatment to the steeping operation.

15. Wet process for the manufacture of starch from corn in which substantially all process waters, except the steep water, are re-used in the process, comprising: steeping the corn; subjecting the steeped corn in a comminuted state and in water to separating operations for the removal of germs and slop; removing the water from the mill starch from these operations to increase the gravity of the mill starch to a density of substantially 10° Baumé or higher; treating the rest of the mill starch to recover first the starch and then, by a settling operation, the gluten; re-using substantially all of the gluten settler water for steeping corn; washing the starch to remove solubles; and using the wash water and the water removed from the mill starch in separating operations on comminuted corn.

16. Wet process for the manufacture of starch from corn in which substantially all process waters, except steep water, are re-used in the process, comprising: steeping the corn; subjecting the corn in a comminuted state and in water to separating operations for removing germs and slop, yielding mill starch streams of different solubles contents; re-using water of low solubles content derived from said mill starch for separating operations on comminuted corn subsequently treated as the process is continued; treating the mill starch at a density of 10° Baumé or higher to recover starch and gluten; and re-using substantially all of the mill starch water, left after the removal of the starch and gluten, for steeping corn.

17. Wet process for the manufacture of starch from corn in which substantially all process waters, except steep water, are re-used in the process, comprising: steeping the corn; subjecting the corn in a comminuted state and in water to separating operations for removing germs and slop, yielding mill starch streams of different solubles contents; re-using water of low solubles content derived from said mill starch for separating operations on comminuted corn subsequently treated as the process is continued; treating the mill starch at a density of substantially 10° Baumé or higher to recover first the starch and then, by a settling operation, the gluten; and re-using substantially all of the gluten settler water for steeping corn.

18. In the process of manufacturing starch from corn by the wet method in which process waters are reused as the process is continued on fresh material and which comprises: steeping the corn and evaporating the steep water; comminuting the steeped corn and subjecting it to separating operations in water for removal of germs and slop; recovering the starch and gluten from the mill starch derived from the separating operations and reusing water that is left for steeping corn: the improvement which consists in reusing in the separating operations water taken from the mill starch in such an amount that substantially all of the water from which the starch and gluten are ultimately recovered may be returned to the steeps with a steep water draw-off not substantially in excess of ten gallons per bushel of corn ground.

19. In the process of manufacturing starch from corn by the wet method in which process waters are reused as the process is continued on fresh material and which comprises: steeping the corn and evaporating the steep water; comminuting the steeped corn and subjecting it to separating operations in water for removing germ and slop; recovering from the mill starch derived from the separating operations first the starch, and then, by a settling operation, the gluten, and reusing gluten settler water for steeping corn: the improvement which consists in reusing in the separating operations water taken from the mill starch in such an amount that substantially all of the gluten settler water may be returned to the steeps with a steep water draw-off not substantially in excess of ten gallons per bushel of corn ground.

20. In the process of manufacturing starch from corn by the wet method in which process waters are reused as the process is continued on fresh material and which comprises: steeping the corn and evaporating the steep water; comminuting the steeped corn and subjecting it to separating operations in water for removal of germs and slop; tabling the mill starch derived from the separating operations to recover the starch; settling the table effluent to remove the gluten; and reusing gluten settler water for steeping corn: the improvement which consists in reusing in the separating operations water taken from the mill starch in such an amount that substantially all of the gluten settler water may be returned to the steeps with a steep water draw-off not substantially in excess of ten gallons per bushel of corn ground.

21. Improved process of manufacturing starch from corn which comprises: steeping the corn and evaporating the steep water, comminuting the steeped corn and subjecting it to separations in water for removal of germs and slop; separating the starch and gluten from the starch, gluten and water mixtures derived from said germ and slop separations, these mixtures being first treated to provide a starch and gluten suspension of such reduced water content that substantially all of the process water left after the recovery of the starch and gluten may be reused for steeping corn, without excessive steep water draw-off; and returning substantially all of said process water to the steeping operation as the process is continued.

22. Improved process of manufacturing starch from corn which comprises: steeping the corn and evaporating the steep water; comminuting the steeped corn and subjecting it to separating operations in water for removal of germs and slop; separating the starch from the mixtures of starch, gluten and water derived from said germ and slop separations and removing the gluten from the process water by a settling operation, the starch, gluten and water mixtures from said germ and slop separations being first treated to provide a starch and gluten suspension of such reduced water content that substantially all of the process waters left after the recovery of the starch and gluten may be used for steeping corn, without excessive steep water draw-off; and returning substantially all of said process water to the steeping operation as the process is continued.

23. Improved process of manufacturing starch from corn which comprises: steeping the corn and evaporating the steep water; comminuting the steeped corn and subjecting it to separating operations in water for removal of germs and slop; tabling the mixtures of starch, gluten and water derived from said germ and slop separations for recovery of the starch, and removing the gluten from the process water by a settling operation, said mixtures of starch, gluten and water from the germ and slop separations being first treated to provide a starch and gluten suspension of such reduced water content that substantially all of the process water left after recovery of the starch and gluten may be used for steeping corn, without excessive steep water draw-off; and returning substantially all of said process water to the steeping operation as the process is continued.

24. Continuous starch making process which comprises: steeping the starch bearing material; subjecting the steeped material to a series of operations for separating starch and gluten from the other insoluble constituents of the material, for separating the gluten from the starch, and for eliminating solubles from the starch, from which operations are derived a process water of maximum solubles content of such volume that substantially all of it may be reused in steeping corn as the process is continued, and also process water of lower solubles content; reusing in the steeping operation substantially all of the process water having the maximum content of solubles; and reusing in the process, for operations subsequent to the steeping substantially all of said other process water.

25. Continuous starch making process which comprises: steeping the starch bearing material; subjecting the steeped material to a series of operations for separating starch and gluten from the other insoluble constituents of the material, for separating the gluten from the starch, and for eliminating solubles from the starch, from which operations are separately derived a process water which has remained in the process for maximum length of time of such volume that substantially all of it may be reused for steeping corn as the process is continued, and also process water which has remained in the process for less time; reusing in the steeping operations substantially all of the process water which has remained in the process for the longest period of time; and re-using in the process for operations subsequent to steeping, substantially all of said other process water.

FREDERICK L. JEFFERIES.